United States Patent
Li et al.

(10) Patent No.: US 8,431,050 B2
(45) Date of Patent: Apr. 30, 2013

(54) CATHODE ACTIVE MATERIAL FOR LITHIUM BATTERY AND METHOD FOR MAKING THE SAME

(75) Inventors: Jian-Gang Li, Beijing (CN); Xiang-Ming He, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 276 days.

(21) Appl. No.: 12/969,592

(22) Filed: Dec. 16, 2010

(65) Prior Publication Data

US 2011/0291042 A1 Dec. 1, 2011

(30) Foreign Application Priority Data

Jun. 1, 2010 (CN) .......................... 2010 1 0189513

(51) Int. Cl.
*H01B 1/08* (2006.01)
(52) U.S. Cl.
USPC ........................................ 252/521.2; 429/224
(58) Field of Classification Search ................ 252/521.2; 429/223, 224
See application file for complete search history.

(56) References Cited

U.S. PATENT DOCUMENTS

2004/0058244 A1* 3/2004 Hosoya et al. ............. 429/231.1

FOREIGN PATENT DOCUMENTS

| CN | 1595689 | | 3/2005 |
|---|---|---|---|
| CN | 1641913 A | | 7/2005 |
| CN | 1787258 | | 6/2006 |
| CN | 101483265 | * | 7/2009 |
| JP | 2005-327644 | * | 11/2005 |
| JP | 2006-344509 A | * | 12/2006 |

OTHER PUBLICATIONS

Luo et al "Synthesis, characterization, and thermal stability of LiNi1/3Mn1/3Co1/3-zMgzO2 . . . ", Chem Mater 2010, 22, 1164-1172 (pub online Dec. 10, 2009).*
Morphological, structural, and electrochemical characteristics of LiNi0.5Mn0.4M0.1O2 (M=Li, Mg, Co, Al), Decheng Li, et al., Journal or power source 157 (2006), p. 488-493.
Lithium Insertion Material of LiNi1/2Mn1/2O2 for Advanced Lithium-ion batteries, Journal of Power Sources 119-121 (2003) 156-160.

* cited by examiner

*Primary Examiner* — Mark Kopec
(74) *Attorney, Agent, or Firm* — Altis Law Group, Inc.

(57) ABSTRACT

The present disclosure relates to a cathode active material for lithium battery including a metal oxide represented by a formula of $LiNi_{0.5}Mn_{0.5-x-y}Co_xMg_yO_2$, wherein $0.05 \leq x \leq 0.15$ and $0.01 \leq y \leq 0.1$. The present disclosure also relates to a method for making a cathode active material including steps of dissolving Ni, Mn, Co, and Mg sources to the liquid solvent at a molar ratio of Ni/Mn/Co/Mg=0.5/(0.5−x−y)/x/y, wherein $0.05 \leq x \leq 0.15$, and $0.01 \leq y \leq 0.1$ to achieve a liquid solution, adding a precipitant into the liquid solution, to achieve a coprecipitation, separating the coprecipitation from the liquid solution, and heating the coprecipitation mixed with a Li source at a temperature of about 600° C. to about 900° C.

10 Claims, 7 Drawing Sheets

CATHODE ACTIVE MATERIAL FOR LITHIUM BATTERY AND METHOD FOR MAKING THE SAME

CROSS-REFERENCE TO RELATED APPLICATIONS

This application claims all benefits accruing under 35 U.S.C. §119 from China Patent Application No. 201010189513.3, filed on Jun. 1, 2010 in the China Intellectual Property Office, the contents of which are hereby incorporated by reference.

BACKGROUND

1. Technical Field

The present disclosure relates to cathode active materials and methods for making the same and, particularly, to a cathode active materials for lithium batteries and methods for making the same.

2. Description of Related Art

Lithium ion batteries using a metal oxide such as $LiCoO_2$ as a cathode active material and a carbonaceous material as an anode material, have high capacities and lifespan. Lithium ion batteries are widely used in portable electronic devices and in high power source markets such as for electric vehicles (EVs) and hybrid electric vehicles (HEVs). $LiCoO_2$ is a commonly used cathode active material in commercial lithium ion batteries. However, $LiCoO_2$ is relatively thermally unstable, toxic, and cobalt is limited.

$LiNi_{0.5}Mn_{0.5}O_2$ is one of the most attractive alternative cathode active materials to the commercial $LiCoO_2$, has been studied recently due to its higher specific capacity, lower cost, and excellent thermal stability. However, a poor rate capacity limits its applications. Yoshinari Makimura et al. studied the rate capability of the $LiNi_{0.5}Mn_{0.5}O_2$ (Lithium Insertion Material of $LiNi_{1/2}Mn_{1/2}O_2$ for Advanced Lithium-ion batteries, Journal of Power Sources 119-121 (2003) 156-160), and the result shows a notable capacity deterioration at a high rate (2 C), which hardly satisfies the actual application needs for a high rate discharge.

What is needed, therefore, is to provide a cathode active material with a good rate performance for lithium battery and a method for making the same.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

One embodiment of a cathode active material includes a metal oxide represented by a formula of $LiNi_{0.5}Mn_{0.5-x-y}Co_xMg_yO_2$, wherein $0.05 \leq x \leq 0.15$, and $0.01 \leq y \leq 0.1$. The cathode active material has an orderly layered structure, good rate capability, and thermal stability.

One embodiment of a method for making the cathode active material includes:

S1, providing a nickel (Ni) source, manganese (Mn) source, cobalt (Co) source, and magnesium (Mg) source, wherein the Ni, Mn, Co and Mg sources are all soluble to a liquid solvent;

S2, dissolving the Ni, Mn, Co, and Mg sources to the liquid solvent at a molar ratio of Ni/Mn/Co/Mg=0.5/(0.5−x−y)/x/y, wherein $0.05 \leq x \leq 0.15$, and $0.01 \leq y \leq 0.1$, to thereby achieve a liquid solution containing nickel ions ($Ni^{2+}$), manganese ions ($Mn^{2+}$), cobalt ions ($Co^{2+}$), and magnesium ions ($Mg^{2+}$);

S3, adding a precipitant into the liquid solution to co-precipitate the $Ni^{2+}$, $Mn^{2+}$, $Co^{2+}$, and $Mg^{2+}$, thereby achieving a coprecipitation;

S4, separating the coprecipitation from the liquid solution; and

S5, heating the coprecipitation mixed with a lithium (Li) source at a temperature of about 600° C. to about 900° C.

In step S1, the Ni source is selected from at least one of nitrate, sulfate, formate, acetate, chloride, and citrate of Ni, the Co source is selected from at least one of nitrate, sulfate, formate, acetate, chloride, and citrate of Co, the Mn source is selected from at least one of nitrate, sulfate, formate, acetate, chloride, and citrate of Mn, and the Mg source is selected from at least one of nitrate, sulfate, formate, acetate, chloride, and citrate of Mg. The liquid solvent is a medium to ionize the Ni, Co, Mn, and Mg sources and to evaporate. The liquid solvent does not have other chemical reactions with the Ni, Co, Mn, and Mg sources. The liquid solvent can be water, ethanol, acetone, or propanol.

In step S2, by dissolving the Ni, Mn, Co, and Mg sources to the liquid solvent, the Ni, Co, Mn, and Mg elements can be uniformly mixed at an atomic level, avoiding segregation, aggregation, and differentiation caused by a solid phase mixing process of the Ni, Mn, Co, and Mg sources.

In step S3, the precipitant can be ionized in the liquid solution to form negative ions, and the negative ions can precipitate the $Ni^{2+}$, $Mn^{2+}$, $Co^{2+}$, and $Mg^{2+}$ from the liquid solvent simultaneously. The precipitant can be a water soluble substance that generates at least one of $CO_3^{2-}$, $C_2O_4^{2-}$, and $OH^-$ in water solvent, such as NaOH, KOH, $Na_2CO_3$, $K_2CO_3$, $Na_2C_2O_4$, $K_2C_2O_4$, $H_2C_2O_4$, or $(NH_4)_2C_2O_4$.

The step S3 can further include steps of: forming a liquid precipitating solution containing the precipitant and mixing the precipitating solution with the liquid solution, thus the two solutions can be uniformly mixed. The mixing step can be processed by slowly dropping the precipitating solution into the liquid solution, while the liquid solution is continuously stirred. The liquid solution can be further stirred for about 4 hours to about 6 hours after the precipitating solution is completely added into the liquid solution, to completely precipitate the $Ni^{2+}$, $Mn^{2+}$, $Co^{2+}$, and $Mg^{2+}$. In another embodiment, the mixing step can be processed by slowly adding both the precipitating solution and the liquid solution into a reactor, and agitating the mixture in the reactor to completely react the precipitating solution with the liquid solution. In case of the precipitant that can generate $OH^-$ in water solvent, the coprecipitation can be represented by a formula of $Ni_{0.5}Mn_{0.5-x-y}Co_xMg_y(OH)_2$. When y=0.05, the coprecipitation can be represented by a formula of $Ni_{0.5}Mn_{0.45-x}Co_xMg_{0.05}(OH)_2$. In another embodiment, the coprecipitation may be represented by a formula of $Ni_{0.5}Mn_{0.5-x-y}Co_xMg_yCO_3$ or $Ni_{0.5}Mn_{0.5-x-y}Co_xMg_yC_2O_4$. When y=0.05, the coprecipitation can be represented by a formula of $Ni_{0.5}Mn_{0.45-x}Co_xMg_{0.05}CO_3$ or $Ni_{0.5}Mn_{0.45-x}Co_xMg_{0.05}C_2O_4$.

In step S4, the coprecipitation can be separated from the liquid solution by a filtering step. The filtered coprecipitation can be washed by deionized water several times, and can be dried for about 12 hours to about 18 hours in a vacuum atmosphere. The achieved coprecipitation has a loose structure and a large specific surface area, which makes it easy for Li to adequately diffusedly enter spaces in the structure during the heating step of S5, to uniformly distribute the Li element.

In step S5, the Li source can be, but not limited to, LiOH, $LiNO_3$, or $Li_2CO_3$. A molar ratio between the Li element in the Li source to a total amount of the Ni, Mn, Co, and Mg elements in the coprecipitation can be larger than 1:1, and smaller or equal to 1.2:1. Excessive Li source compensates the loss of the Li element during the heating step.

The step S5 can further include the steps: uniformly mixing the coprecipitation with the Li source such as grinding to achieve a solid mixture; and calcining the solid mixture at a high temperature. The solid mixture can be calcined in a muffle furnace in air. The calcining step can have two periods. During the first period, the solid mixture is slowly heated from room temperature to a first temperature of about 600° C. to about 700° C. and is calcined at the first temperature for about 6 hours to about 8 hours. The time for heating the solid mixture from room temperature to the first temperature can be about 6 hours to about 12 hours. During the second period, the calcining temperature of the solid mixture is elevated from the first temperature to a second temperature of about 800° C. to about 900° C., and is calcined at the second temperature for about 16 hours to about 24 hours. The second temperature should not be too high or too low. The product may have impurities when the second temperature is too low. However, the product may have lattice defects and a lesser order layered structure caused by the Li loss during calcining when the second temperature is too high. After the heating step, the lithium-nickel-manganese-cobalt-magnesium oxide can be achieved.

EXAMPLE 1

In this example, the Ni, Co, Mn, and Mg sources are the nitrate. To prepare $LiNi_{0.5}Mn_{0.5-x-y}Co_xMg_yO_2$, wherein x=0.05 and y=0.05, the $Ni(NO_3)_2$, $Mn(NO_3)_2$, $Co(NO_3)_2$, and $Mg(NO_3)_2$ are provided at a molar ratio of about 0.5:0.4:0.05:0.05, and dissolved in water. NaOH used as the precipitant is firstly dissolved in water to form a NaOH water solution. The NaOH water solution is then mixed with the water solution of the $Ni(NO_3)_2$, $Co(NO_3)_2$, $Mn(NO_3)_2$, and $Mg(NO_3)_2$, to form the coprecipitation. LiOH used as the Li source is mixed with the dried coprecipitation. The molar ratio between LiOH and the total amount of Ni, Co, Mn, and Mg is about 1.05:1 (i.e., LiOH/(Ni+Co+Mn+Mg)=1.05/1). The solid mixture is calcined at the first temperature of about 600° C. for about 4 hours, and at the second temperature of about 800° C. for about 16 hours, in the muffle furnace in air.

EXAMPLE 2

The cathode active material of $LiNi_{0.5}Mn_{0.5-x-y}Co_xMg_yO_2$, wherein x=0.05 and y=0.05 is prepared in the same way as in Example 1, except the second temperature is about 850° C.

EXAMPLE 3

The cathode active material of $LiNi_{0.5}Mn_{0.5-x-y}Co_xMg_yO_2$, wherein x=0.05 and y=0.05 is prepared in the same way as in Example 1, except the second temperature is about 900° C.

EXAMPLE 4

The cathode active material of $LiNi_{0.5}Mn_{0.5-x-y}Co_xMg_yO_2$, wherein x=0.1 and y=0.05 is prepared in the same way as in Example 1, except the molar ratio is about 0.5:0.35:0.1:0.05 for the $Ni(NO_3)_2$, $Mn(NO_3)_2$, $Co(NO_3)_2$, and $Mg(NO_3)_2$.

EXAMPLE 5

The cathode active material of $LiNi_{0.5}Mn_{0.5-x-y}Co_xMg_yO_2$, wherein x=0.1 and y=0.05 is prepared in the same way as in Example 4, except the second temperature is about 850° C.

EXAMPLE 6

The cathode active material of $LiNi_{0.5}Mn_{0.5-x-y}Co_xMg_yO_2$, wherein x=0.1 and y=0.05 is prepared in the same way as in Example 4, except the second temperature is about 900° C.

EXAMPLE 7

The cathode active material of $LiNi_{0.5}Mn_{0.5-x-y}Co_xMg_yO_2$, wherein x=0.15 and y=0.05 is prepared in the same way as in Example 1, except the molar ratio is about 0.5:0.3:0.15:0.05 for the $Ni(NO_3)_2$, $Mn(NO_3)_2$, $Co(NO_3)_2$, and $Mg(NO_3)_2$.

EXAMPLE 8

The cathode active material of $LiNi_{0.5}Mn_{0.5-x-y}Co_xMg_yO_2$, wherein x=0.15 and y=0.05 is prepared in the same way as in Example 7, except the second temperature is about 850° C.

EXAMPLE 9

The cathode active material of $LiNi_{0.5}Mn_{0.5-x-y}Co_xMg_yO_2$, wherein x=0.15 and y=0.05 is prepared in the same way as in Example 7, except the second temperature is about 900° C.

Figure 1:
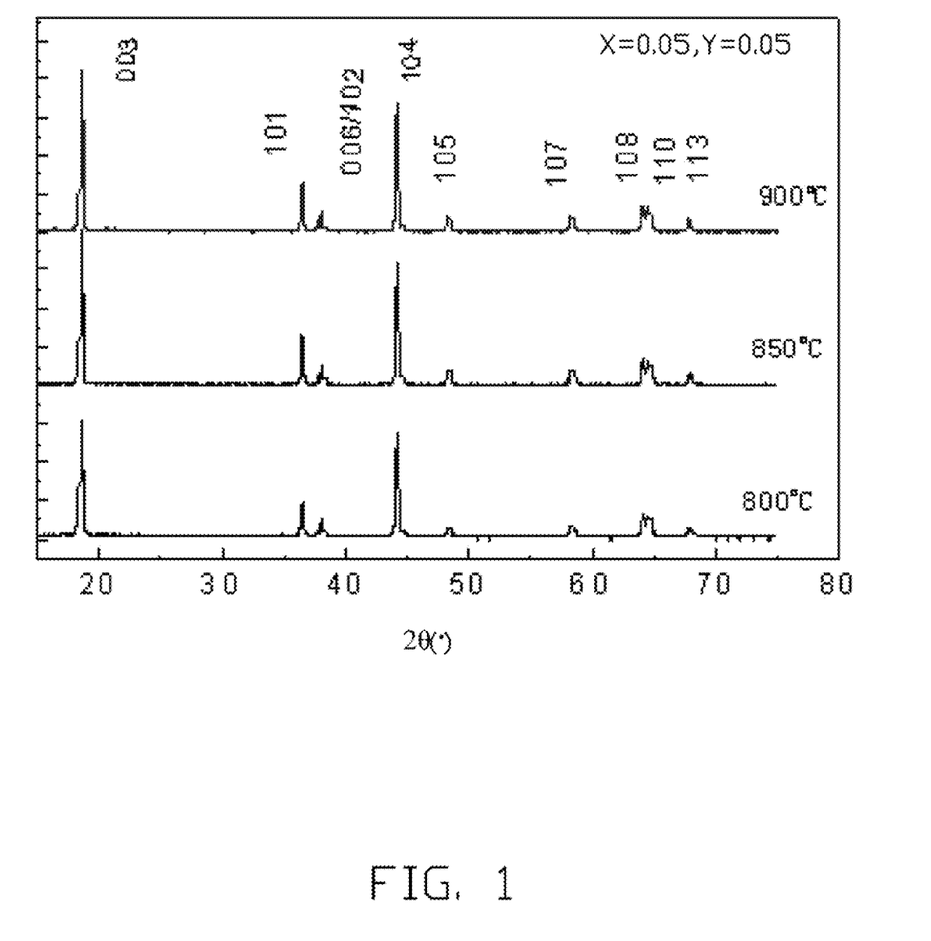
FIG. 1 is a graph showing X-ray diffraction (XRD) patterns of cathode active materials of examples 1-3.
Figure 2:
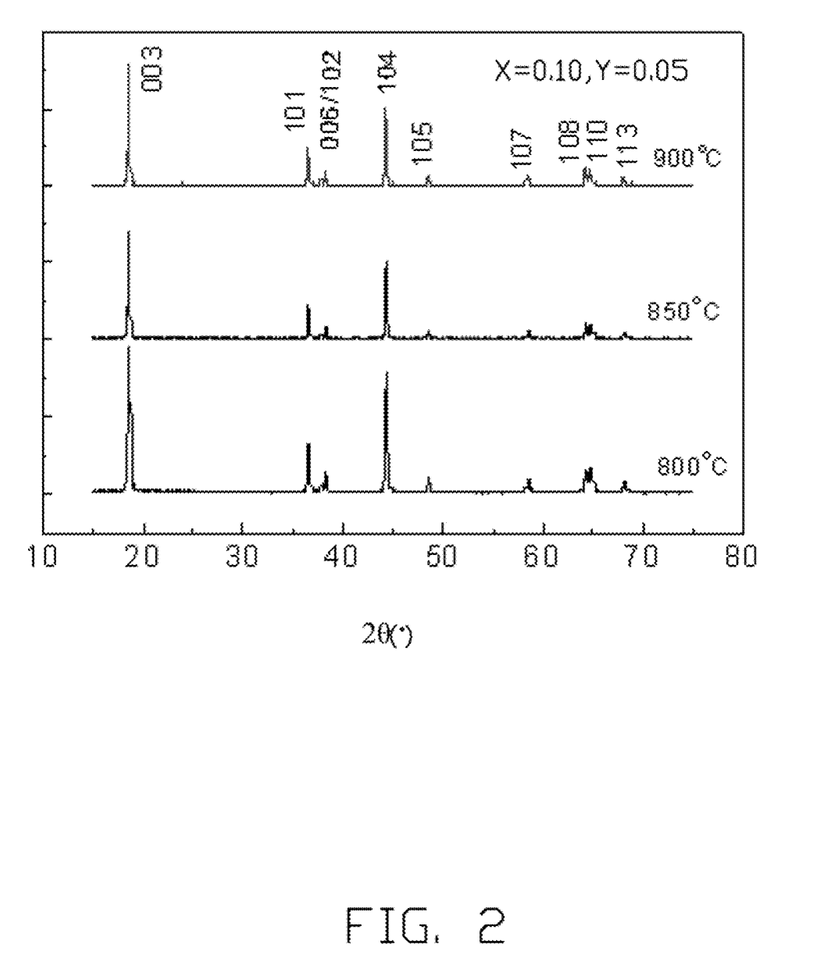
FIG. 2 is a graph showing XRD patterns of cathode active materials of examples 4-6.
Figure 3:
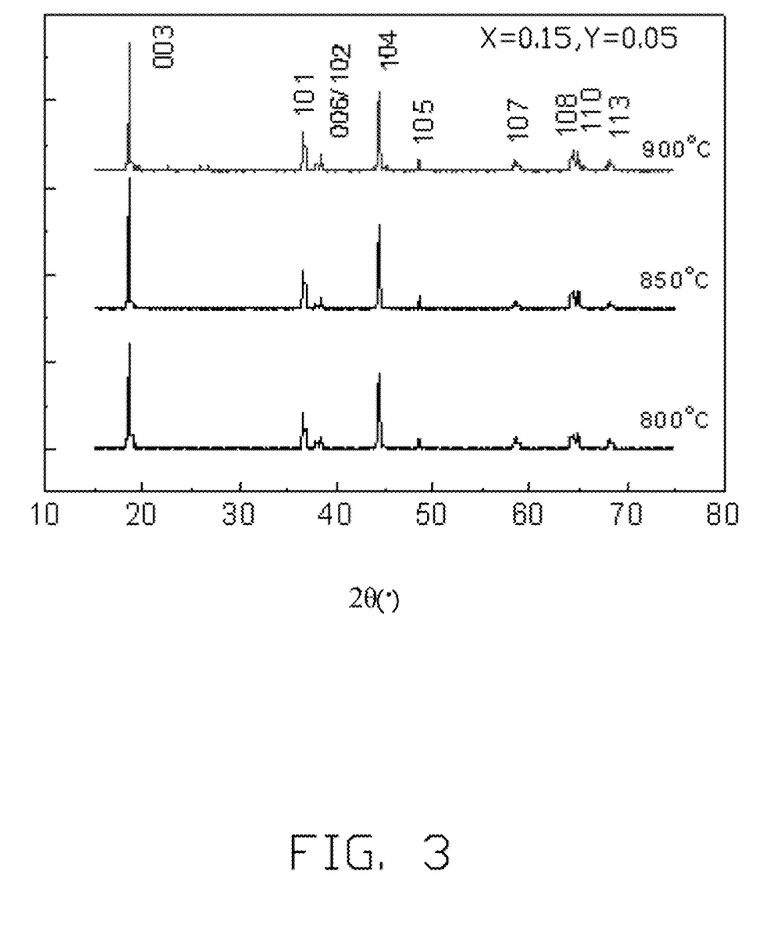
FIG. 3 is a graph showing XRD patterns of cathode active materials of examples 7-9.

The resulting products of Examples 1-9 are subjected to XRD measurement. Referring to FIGS. 1-3, all the products of Examples 1-9 have sharp diffraction peaks indicating a high degree of crystallinity, and can be indexed based on the layered α-$NaFeO_2$ structure. The Examples 2, 5, and 8 using the second temperature of about 850° C., have apparent diffraction peak splits at the peaks (006)/(102) and (108)/(110), indicating a good degree of order of the layered structure. Therefore, the XRD analysis shows that the samples synthesized at 850 present better characteristics of the layered α-$NaFeO_2$ structure than the samples synthesized at 800° C. and 900° C.

Figure 4:
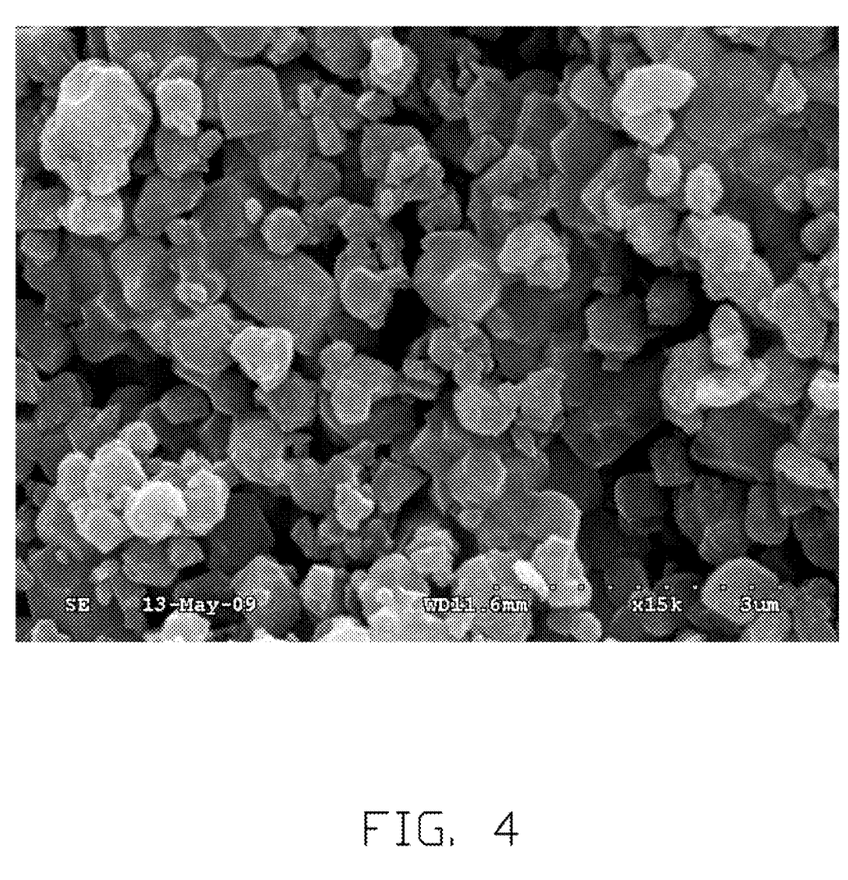
FIG. 4 is a photo showing a Scanning Electron Microscope (SEM) image of a cathode active material of example 5.

Particle morphologies of the products of Examples 1-9 are observed by SEM, revealing that the particle size of $LiNi_{0.5}Mn_{0.45-x}Co_xMg_{0.05}O_2$ increases as the heating temperatures and Co contents increase. Referring to FIG. 4, the SEM photo of $LiNi_{0.5}Mn_{0.35}Co_{0.1}Mg_{0.05}O_2$ of Example 5 shows that the product has a grain shape with relatively smooth surface and clear grain boundaries.

Three kinds of lithium batteries respectively using the products of Example 2, 5, and 8 are assembled and compared for electrochemical characterization. The lithium batteries are assembled by the following method. First, about 80 parts by mass of the cathode active material, about 10 parts by mass of acetylene black as a conductive assistant, and about 10 parts by mass of polyvinylidene fluoride (PVDF) as a binder, which is previously dissolved in N-methylpyrrolidone (NMP), are mixed together to form a slurry. Next, the slurry is uniformly coated on a surface of an aluminum foil, and dried in a vacuum oven for about 24 hours to make a positive electrode. A separator made of a microporous polypropylene film (Celgard 2400) is placed between the positive electrode and a negative electrode made of a lithium foil. A non-aqueous solution is used as an electrolyte, in which $LiPF_6$ is dissolved in a concentration of about 1 mol/L in a mixed solvent containing ethylene carbonate (EC), dimethyl carbonate (DMC), and ethylmethyl carbonate (EMC) in a volume ratio of about 1:1:1. The CR2032 coin-type lithium batteries are then assembled in a glove box.

Figure 5:
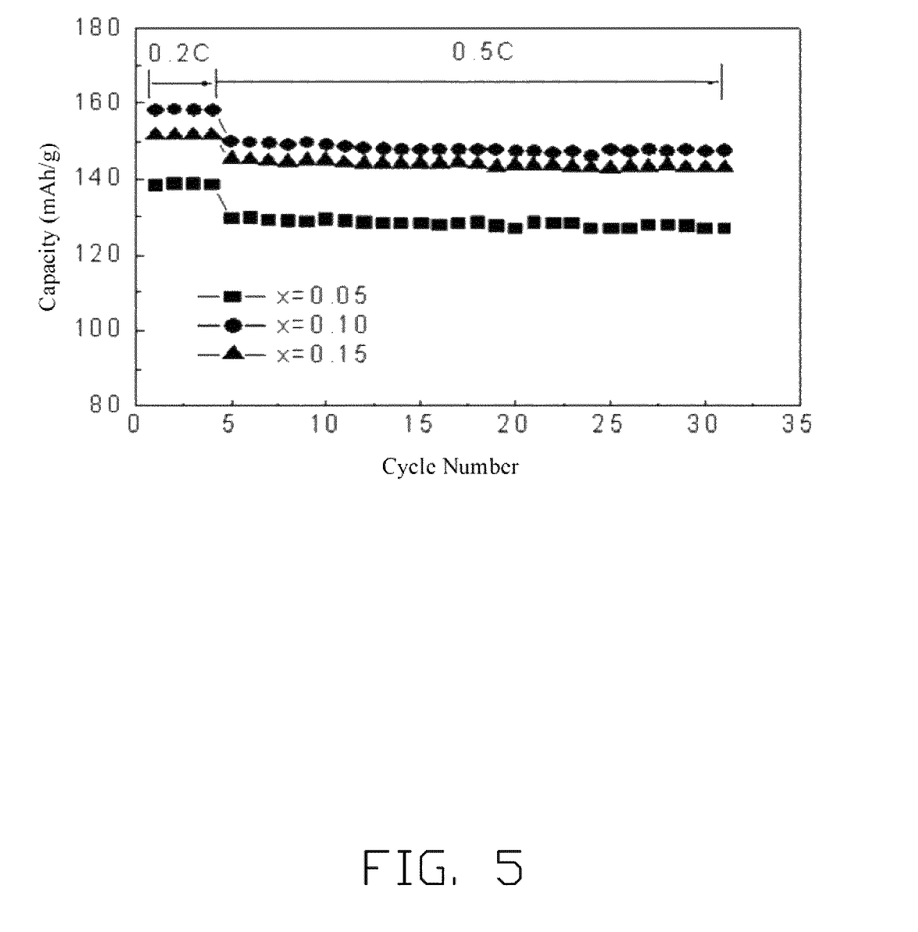
FIG. 5 is a graph showing cycle performance testing results of lithium batteries using $LiNi_{0.5}Mn_{0.45-x}Co_xMg_{0.05}O_2$ as the cathode active material, wherein x=0.05, 0.1, and 0.15 of examples 2, 5, and 8.

The charge-discharge tests for the three kinds of lithium batteries are galvanostatically performed in a voltage range of about 2.5V to about 4.3V at a current rate of about 0.5 C. Referring to FIG. 5, all three kinds of lithium batteries have good cycling stabilities. The initial discharge capacities of the three kinds of lithium batteries are about 138.7 mAh/g for x=0.05, about 158.3 mAh/g for x=0.10, and about 151.7 mAh/g for x=0.15 of the $LiNi_{0.5}Mn_{0.45-x}Co_xMg_{0.05}O_2$ synthesized at about 850° C. After being respectively charged-discharged for about 30 cycles in the voltage range of about 2.5V to about 4.3V at the current rate of about 0.5 C, and the lithium batteries respectively have about 97.6%, about 98.1%, and about 93.0% of the initial capacities remaining. During the charge-discharge processes, the Mg ions which substitute a part of the Mn ions in the structure of the cathode active material, are not involved in the electrochemical reaction, thereby increasing the structural stability of the cathode active material. Thus, the cycling stability of the lithium batteries at a high voltage and a high temperature can be improved.

Figure 6:
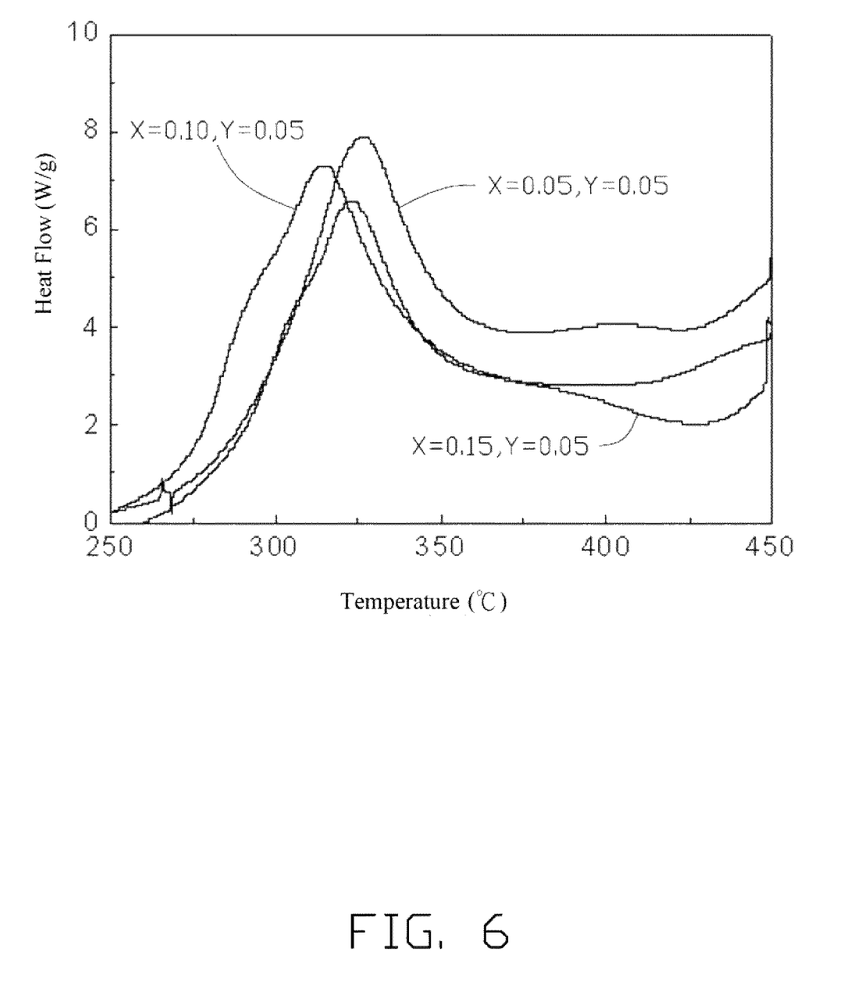
FIG. 6 is a graph showing scanning calorimetry (DSC) testing results of the lithium batteries of FIG. 5.

The three kinds of lithium batteries are fully charged to a voltage of about 4.3V, and then the cathode active materials are removed from the current collector, separated from the conductive assistant and the binder, and used for DSC measurements. Referring to FIG. 6, all the heat flows of the cathode active materials respectively come from the three kinds of lithium batteries are smaller than 350 J/g. The DSC results indicate that all of the three kinds of lithium batteries having the cathode active materials synthesized at about 850° C. show good thermal stabilities.

Figure 7:
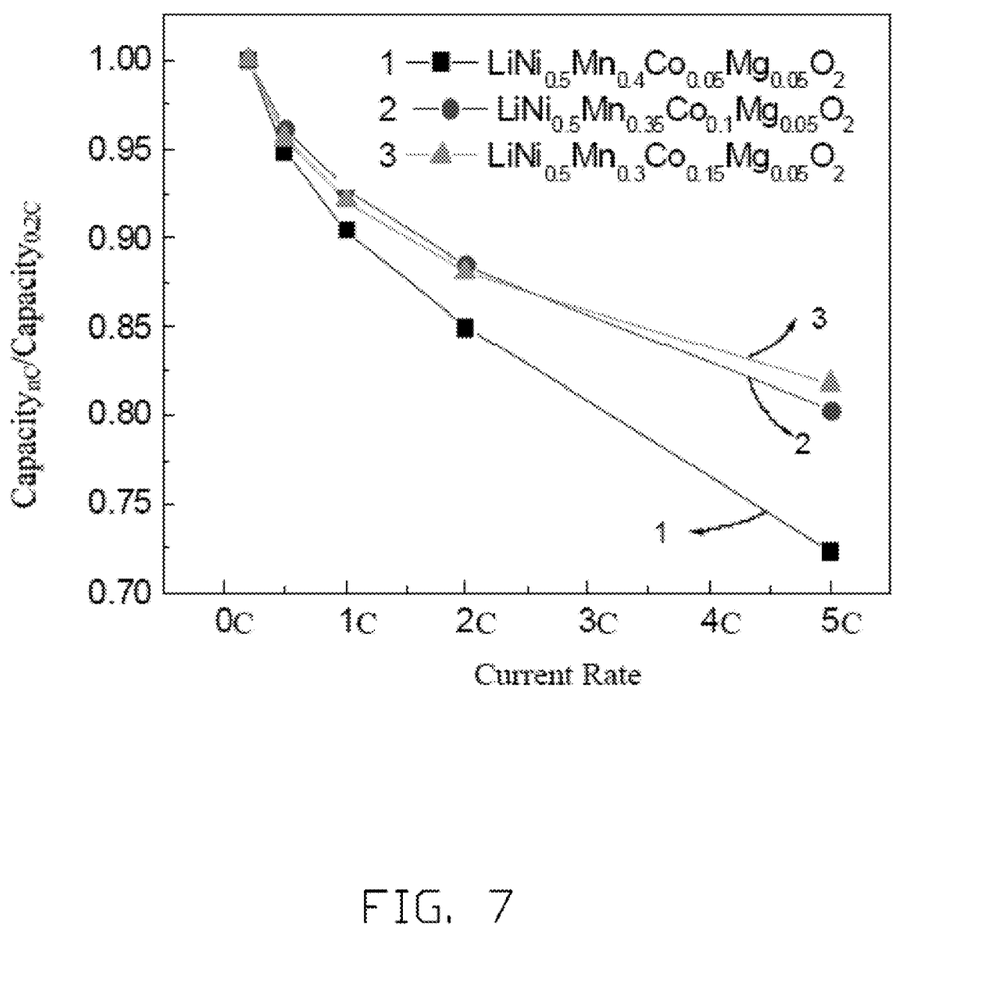
FIG. 7 is a graph showing rate capability testing results of the lithium batteries of FIG. 5

As the Co content in $LiNi_{0.5}Mn_{0.45-x}Co_xMg_{0.05}O_2$ increases, the current rate capability improves due to the decrease of electrochemical impedance. Referring to FIG. 7, the three kinds of lithium batteries are galvanostatically cycled and compared at different current rates. In FIG. 7, the vertical axis of $Capacity_{nC}/Capacity_{0.2C}$ represents a ratio of the capacity of the lithium battery at a current rate to the capacity of the lithium battery at about 0.2 C, and the horizontal axis represents the current rate. When the current rate is about 5 C, the lithium battery having the product of Example 8 as the cathode active material has 82.5% of the capacity of lithium battery at about 0.2 C.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A cathode active material for a lithium battery, comprising a metal oxide represented by a formula of $LiNi_{0.5}Mn_{0.45-x}Co_xMg_{0.05}O_2$, wherein $0.05 \leqq x \leqq 0.15$.

2. The cathode active material of claim 1, wherein x=0.05.

3. The cathode active material of claim 1, wherein x=0.1.

4. The cathode active material of claim 1, wherein x=0.15.

5. The cathode active material of claim 1 comprising a charge and discharge voltage range of about 2.5V to about 4.3V.

6. A method for making a cathode active material comprising steps:
   providing a Ni source, Mn source, Co source, and Mg source, wherein the Ni, Mn, Co, and Mg sources are all soluble to a liquid solvent;
   dissolving the Ni, Mn, Co, and Mg sources to the liquid solvent at a molar ratio of Ni/Mn/Co/Mg=0.5/(0.45−x)/x/0.05, wherein $0.05 \leqq x \leqq 0.15$, to thereby achieve a liquid solution containing nickel ions, manganese ions, cobalt ions, and magnesium ions;
   adding a precipitant into the liquid solution to co-precipitate the nickel ions, manganese ions, cobalt ions, and magnesium ions, thereby achieving a coprecipitation;
   separating the coprecipitation from the liquid solution;
   uniformly mixing the coprecipitation with the Li source, to achieve a solid mixture;
   heating the solid mixture to a first temperature of about 600° C. to about 700° C. and calcining at the first temperature for about 6 hours to 8 hours; and
   elevating the first temperature to a second temperature of about 800° C. to about 900° C. and further calcining at the second temperature for about 16 hours to about 24 hours.

7. The method of claim 6, wherein the Ni source is selected from at least one of nitrate, sulfate, formate, acetate, chloride, and citrate of Ni, the Co source is selected from at least one of nitrate, sulfate, formate, acetate, chloride, and citrate of Co, the Mn source is selected from at least one of nitrate, sulfate, formate, acetate, chloride, and citrate of Mn, and the Mg source is selected from at least one of nitrate, sulfate, formate, acetate, chloride, and citrate of Mg.

8. The method of claim 6, wherein the liquid solvent is selected from the group consisting of water, ethanol, acetone, propanol, and combinations thereof.

9. The method of claim 6, wherein the precipitant generates at least one of $CO_3^{2-}$, $C_2O_4^{2-}$, and $OH^-$ in the liquid solvent.

10. The method of claim 6, wherein the second temperature is about 850° C.

* * * * *